Sept. 14, 1954   H. W. TREVASKIS   2,689,024
VEHICLE DISK BRAKE
Filed March 10, 1953   2 Sheets-Sheet 1
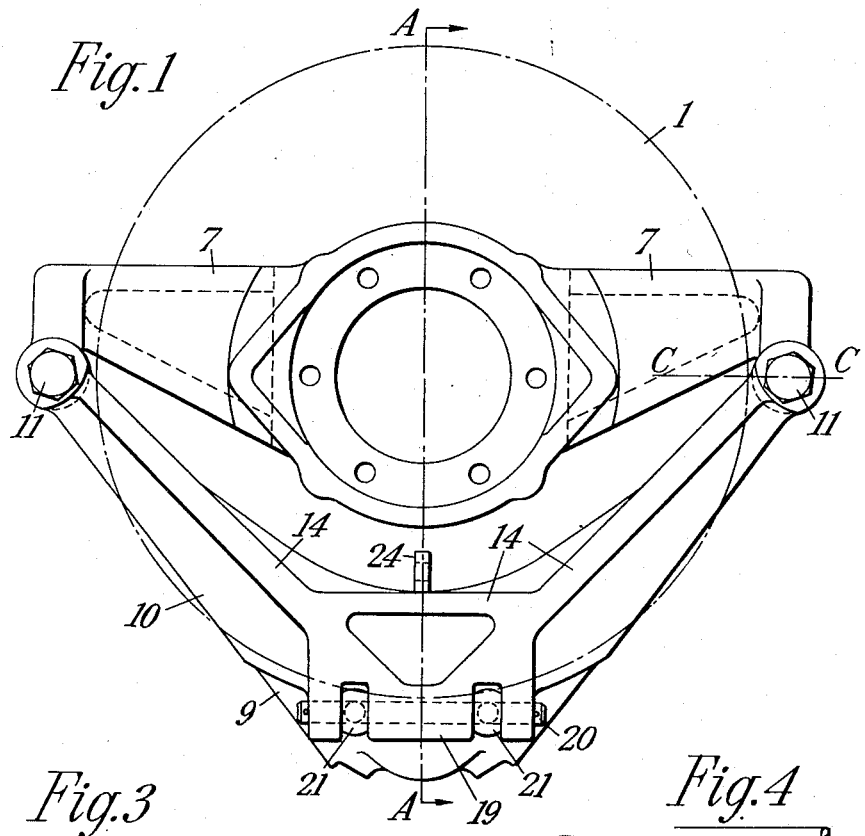

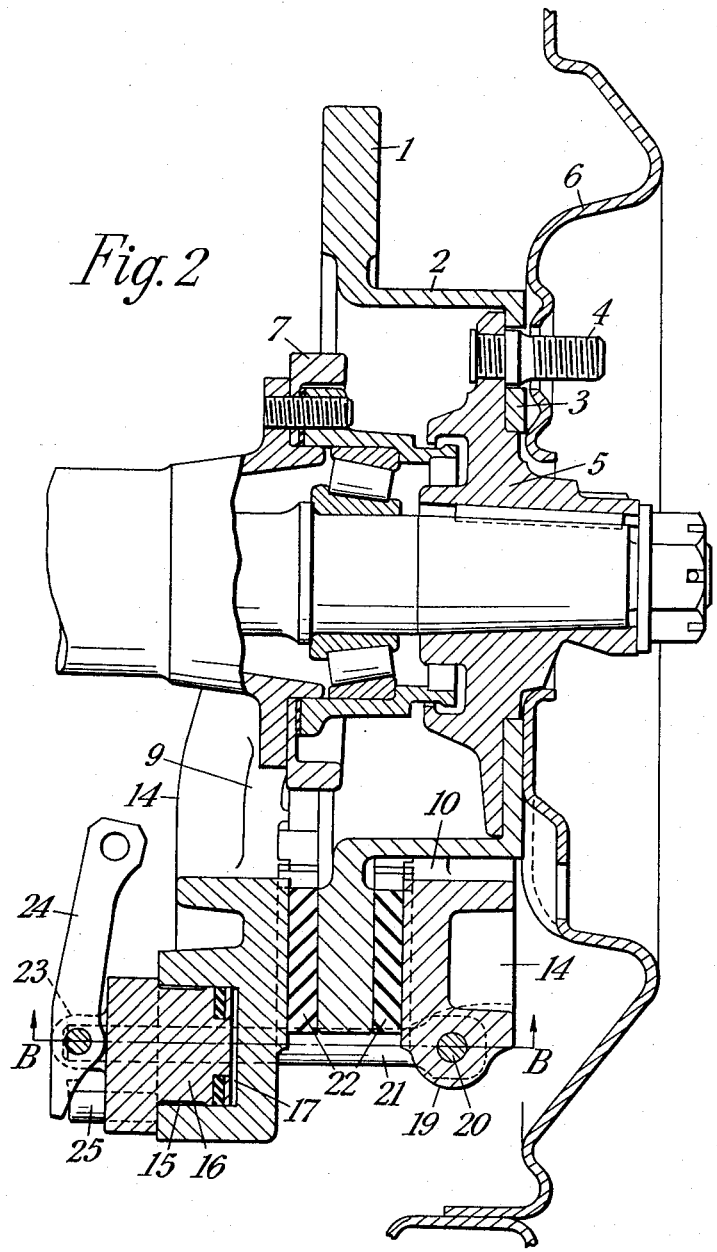

Patented Sept. 14, 1954

2,689,024

UNITED STATES PATENT OFFICE 2,689,024

VEHICLE DISK BRAKE

Henry William Trevaskis, Solihull, England, assignor to Dunlop Rubber Company Limited, London, England, a British company Application March 10, 1953, Serial No. 341,502

Claims priority, application Great Britain March 12, 1952

5 Claims. (Cl. 188—152)

This invention relates to vehicle disc brakes and more particularly to disc brakes for motor vehicles.

The object of the present invention is to provide a disc brake for motor vehicles which is robust, economical to produce and efficient in operation.

According to the present invention a disc brake for vehicles comprises a rotatable disc, a pair of wishbone shaped pressure plate axially aligned one on each side of the disc, a non-rotatable torque member extending substantially diametrically across one side of the disc, a pivotal connection between the extremities of the pressure plates and the ends of the torque member, pads of friction material secured to each plate adjacent the apex thereof to frictionally engage both sides of the disc, a cylinder formed integral with one pressure plate at the apex thereof and on the side remote from the disc, a piston fluid-tightly slidable in said cylinder, and means extending axially adjacent a periphery of the disc to connect said piston with the other pressure plate, whereby an increase in fluid pressure between the piston and the base of the cylinder angularly moves both pressure plates towards the disc to effect frictional engagement between the friction pads and the disc.

Preferably the piston is provided with a portion projecting exterior of the cylinder and two members, each having one end secured at diametrically opposed locations to said portion, extend axially through holes in the adjacent pressure plate, extend adjacent the outer periphery of said disc, and have their other ends pivotally secured to the pressure plate on the other side of the disc.

Preferably also a disc brake in accordance with the invention has associated therewith a hand-brake mechanism whereby the brake may be applied mechanically independently of, or in conjunction with, the fluid pressure operated mechanism.

In order that the invention may be more fully described, reference is made to the accompanying drawings, of which Figure 1 is a view of a disc brake assembly constructed in accordance with the present invention Figure 2 is a section through the line A—A of Figure 1, looking in the direction of the arrows, and showing a part of an associated wheel structure Figure 3 is a sectional view of the brake operating mechanism taken through the line B—B of Figure 2 and looking in the direction of the arrows, and Figure 4 is a part sectional view of the means for pivotally attaching the ends of the arms of the pressure plates to the torque member, and is taken through the line C—C of Figure 1.

The assembly comprises an annular disc 1 having a cylindrical portion 2 extending axially from the inner periphery thereof. From the end of said cylindrical portion an annular flange 3 extends radially inwardly, and this flange is secured by studs 4 to the rotatable hub 5 of an associated wheel 6. The disc is thus rotatable by the wheel.

Secured to a non-rotatable part of the wheel assembly is a hollow torque member 7 which extends substantially diametrically across the disc and adjacent the side thereof remote from the annular flange 3. The two ends of said torque member extend to a location adjacent the outer periphery of the disc, each end being provided integrally with a boss 8 which is radially in line with said disc.

Two wishbone or V-shaped pressure plates 9 and 10 are provided, axially-aligned one on each side of the disc, the extremities thereof being located one on each side of an adjacent boss 8 of the torque member. An axially aligned hole is provided through each boss and through the associated extremities of the two pressure plates and a bolt 11 is fitted through each set of holes. A rubber washer 12 is located between the two sides of the boss and the adjacent sides of the associated extremities of the two pressure plates. A nut 13 is secured to the end of the bolt remote from its head. The arrangement is such that the washers allow the pressure plates to pivot slightly about the bolts in the ends of the torque member, the diameter of the holes in said pressure plates being slightly greater than that of the bolts.

The pressure plates are provided with ribs 14 on their sides remote from the disc to increase stiffness. The pressure plate 9 is provided at its apex and on the side remote from the disc with a cylinder 15 extending axially away from the disc and fluid-tightly slidable in said cylinder is a piston 16, a portion of which projects exterior of the cylinder. A space 17 between the piston and the base of the cylinder is connected to a source of fluid pressure, e. g. a master-cylinder. The portion of the piston projecting exterior of the cylinder is provided with two diametrically-opposed lugs 18 each having a hole extending axially therethrough.

The other pressure plate 10 on the other side of the disc is provided, at the apex thereof, with a part cylindrical boss 19, the axis thereof being normal to a diameter of the disc and being bisected by said diameter. A hole extends axially through said boss and secured therein is a pin 20. The boss is laterally slotted at two locations and two eye bolts 21 are provided, the eyes thereof being located within said slots and being fitted over the pin 20. Said bolts extend axially adjacent the outer periphery of the disc, through holes provided in the pressure plate 9 and the ends thereof are secured to the lugs 18 of the piston.

Pads of friction material 22 are secured to the sides of the pressure plates 9 and 10 adjacent the disc and at the apices thereof to frictionally engage the disc.

The operation of the brake is as follows. An increase in pressure between the piston and the base of the cylinder, as by operating a master cylinder, forces the piston and the base of the cylinder mutually away from one another. The pressure plate 9 is thus forced inwardly towards the disc and simultaneously the piston, moving outwardly of the cylinder and acting through the eye bolts and the pin 20 draws the pressure plate 10 towards the disc. The disc is thus nipped between the friction pads secured to the two plates and the frictional engagement caused thereby decelerates the disc, and hence the wheel secured thereto.

A hand brake mechanism is also incorporated whereby the brake may be operated manually. The portion of the piston projecting exterior of the cylinder is provided centrally with a pair of lugs 23 and a lever arm 24 is pivotally secured thereto, at a location intermediate its ends. One end of the arm has secured thereto a wire cable or like means for connection to a hand brake and the other end is adapted to bear upon one end of a peg 25 which is slidable through a hole extending axially through the projecting portion of the piston, the other end thereof bearing on the side of the cylinder 15 at the open end thereof. Thus angular movement of the lever arm in one direction acting through the lugs 23, piston 16, eye-bolts 21 and pin 20 moves pressure plate 10 inwardly towards the disc, whilst the end of said arm, acting through the peg 25 and cylinder 15 forces pressure plate 9 inwardly towards the disc, thus forcing the pads of friction material into frictional engagement with the disc, and so braking the wheel.

A vehicle disc brake of the type described is light, efficient and is capable of easy maintenance.

Having described my invention, what I claim is:

1. A disc brake for vehicles comprising a rotatable disc, a pair of wishbone shaped pressure plates axially aligned one on each side of the disc, a non-rotatable torque member extending substantially diametrically across one side of the disc, a pivotal connection between the extremities of the pressure plates and the ends of the torque member, pads of friction material secured to each plate adjacent the apex thereof to frictionally engage both sides of the disc, a cylinder formed integral with one pressure plate at the apex thereof and on the side remote from the disc, a piston fluid-tightly slidable in said cylinder and means extending axially adjacent a periphery of the disc to connect said piston with the other pressure plate, whereby an increase in fluid pressure between the piston and the base of the cylinder angularly moves both pressure plates towards the disc to effect frictional engagement between the friction pads and the disc.

2. A disc brake according to claim 1 wherein the piston is provided with a portion projecting exterior of the cylinder and two members, each having one end secured at diametrically opposed locations to said portion, extend axially through holes in the adjacent pressure plates, extend adjacent the outer periphery of said disc, and have their other ends pivotally secured to the pressure plate on the other side of the disc.

3. A disc brake according to claim 2 wherein said members are eye-bolts, the eye-portions being rotatably fitted over a pin secured to one pressure plate, and the other ends of said bolts being secured to the projecting portion of the piston associated with the other pressure plate.

4. A disc brake according to claim 2 wherein the ends of the torque member are each provided with a boss radially in line with said disc and the associated extremities of said pressure plates are secured thereto by means of a bolt passing axially through said extremities and said boss, and a resilient washer is interposed between the adjacent sides of said boss and said extremities to allow angular movement of said pressure plates relative to said boss and bolt.

5. A disc brake according to claim 2 wherein a lever arm is pivotally secured to the centre of the projecting part of the piston, one end thereof bearing on a peg which slidably fits through a hole in said portion and is seated on the adjacent end of the cylinder and the other end of which is adapted to be secured to a hand brake mechanism or the like, whereby angular movement of said lever arm in one direction moves both pressure plates angularly towards the disc to effect frictional engagement between the friction pads and disc.

References Cited in the file of this patent

UNITED STATES PATENTS

| Number | Name | Date |
| --- | --- | --- |
| 1,959,049 | Buus | May 15, 1934 |
| 1,995,135 | Williams et al. | Mar. 19, 1935 |
| 2,115,083 | Pierce | Apr. 26, 1938 |